United States Patent [19]
Schmitt

[11] Patent Number: 6,042,308
[45] Date of Patent: Mar. 28, 2000

[54] THREAD MILLING CUTTER WITH POSITIONED TOOTH FLANKS

[76] Inventor: M. Norbert Schmitt, Schwalbenweg 3, D-90537 Feucht, Germany

[21] Appl. No.: 09/293,501

[22] Filed: Apr. 15, 1999

[30] Foreign Application Priority Data

Apr. 17, 1998 [DE] Germany .......................... 198 17 020

[51] Int. Cl.⁷ ................ B23C 3/00; B23G 5/20
[52] U.S. Cl. ............... 407/24; 407/29; 407/42; 407/53; 407/56; 409/74; 408/222
[58] Field of Search .................. 407/61, 56, 58, 407/24, 27, 29, 34, 42, 53, 113; 408/222; 409/65, 74; 470/71, 94, 107, 199

[56] References Cited

U.S. PATENT DOCUMENTS

| | | | |
|---|---|---|---|
| 1,441,015 | 1/1923 | Marye | 407/24 |
| 1,567,733 | 12/1925 | Hanson | 407/24 X |
| 4,717,177 | 10/1979 | Barnsdale | 408/222 X |
| 5,678,962 | 10/1997 | Hyatt et al. | 409/74 X |
| 5,733,078 | 3/1998 | Matsushita et al. | 409/74 |

*Primary Examiner*—Henry W. H. Tsai
*Attorney, Agent, or Firm*—Brown & Wood, LLP

[57] ABSTRACT

A thread milling cutter including a shank and a milling region adjoining the shank at a front end of the shank and including at least two rows of teeth and extending parallel to each other, with the teeth of both rows having the same height and forming each two flanks, with the respective teeth of both rows being associated with respective circumferential planes, and with one flank of a respective tooth of one of the rows being shifted, viewed in a circumferential direction, in an axial direction, forward with respect to one flank of a respective tooth of another of the rows, or another flank of the respective tooth of the another of the rows being shifted viewed in a circumferential direction, in the axial direction, backward with respect to another flank of the respective tooth of the one of the rows, the one flank forming a front offset and another flank forming a rear offset, with front and rear offsets alternating with each other.

4 Claims, 1 Drawing Sheet

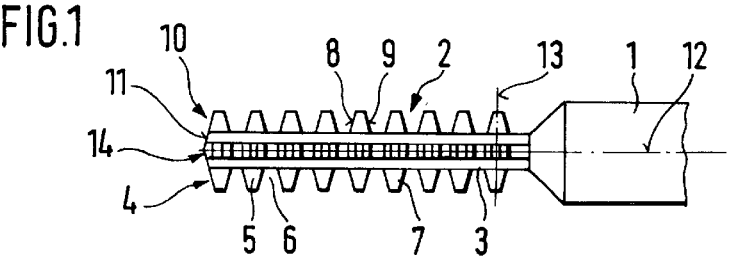
FIG. 1
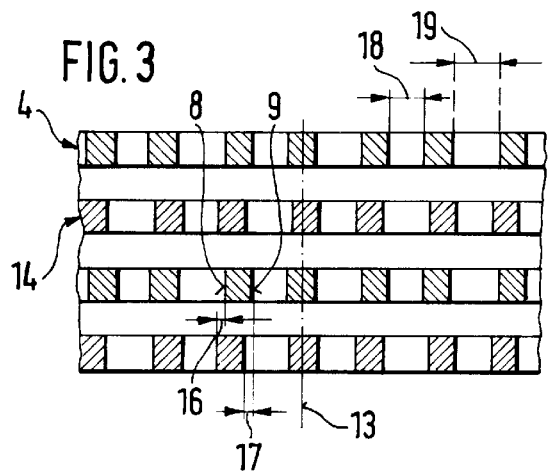
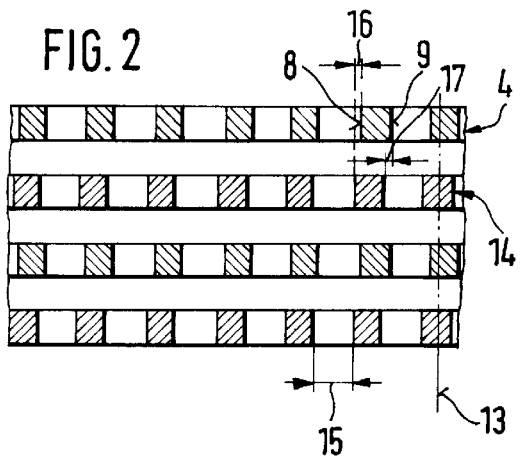
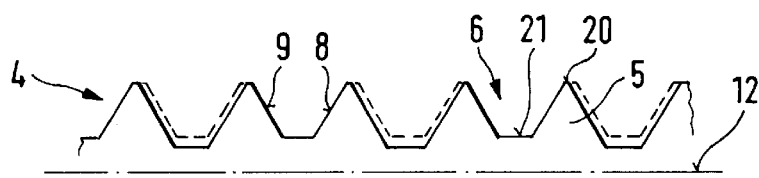
FIG. 4
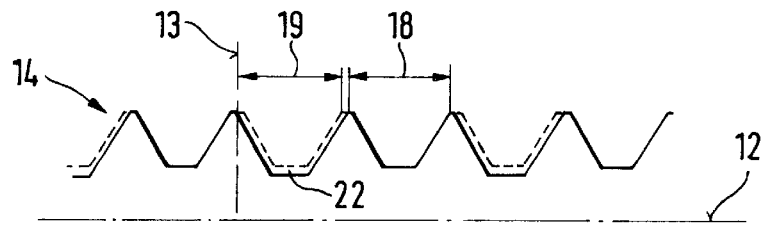
FIG. 5
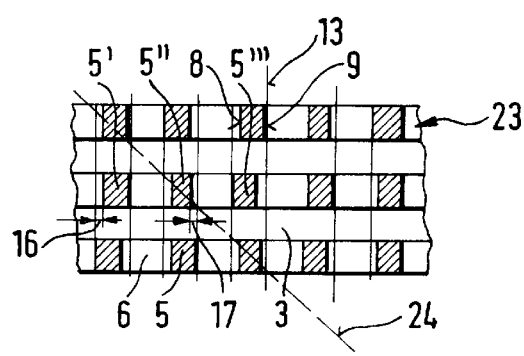
FIG. 6

THREAD MILLING CUTTER WITH POSITIONED TOOTH FLANKS

BACKGROUND OF THE INVENTION

1. Field of the Invention

The present invention relates to a thread milling cutter with positioned tooth flanks and which is imparted with rotational, circular and feed movements for effecting thread milling at which, upon thread milling of a work piece, chips having a definite thickness are produced, with the rotational speed of the rotational movement exceeding the rotational speed of the circular movement, which thread milling cutter includes at least two rows of teeth and extending parallel to each other, with the teeth of both rows having the same height and two flanks, with each flank occupying a predetermined position with respect to a longitudinal axis of the thread milling cutter, and with the respective teeth of both rows being associated with respective circumferential planes.

2. Description of the Prior Art

A thread milling cutter of this type is disclosed in European Publication EP-0 429 917. In this milling cutter, all of the teeth of all rows associated with respective circumferential planes have the same shape. The flanks of all of the teeth associated with a respective circumferential plane occupy, with respect to the thread milling cutter axis, the same position. In the thread milling cutter of this European application, each tooth removes metal at both flanks in the same way all the time. Thereby, a V-shaped chip is formed which, because of its cross-section, is released from and rolls off the workpiece with some difficulty. Thereby, the necessary cutting force is relatively high.

Accordingly, an object of the present invention is a thread milling cutter of the above-discussed type which permits milling of a thread with a smaller cutting force.

Another object of the present invention is a thread milling cutter of the above-discussed type which provides for a better release of a chip from the workpiece during the milling operation.

SUMMARY OF THE INVENTION

These and other objects of the present invention, which will become apparent hereinafter, are achieved by providing a thread milling cutter of the above-discussed type in which for each circumferential plane, viewed in a circumferential direction, one flank of a respective tooth of one of the rows is shifted, in an axial direction, forward with respect to one flank of a respective tooth of another of the rows, or another flank of the respective tooth of the another of the rows is shifted, in the axial direction, backward with respect to another flank of the respective tooth of the one for the rows, and in each teeth, the one flank forms a front offset and the other flank forms a rear offset, with front and rear offsets alternating with each other.

The front and rear offsets of tooth flanks according to the present invention produce, during thread milling, chips which substantially deviate from conventional V-chips and, as a result, better roll off or released from the workpiece. The maximal offset is determined by the shape of the teeth and by their load carrying ability. The cut material is removed by the rearwardly offset flank of a tooth and is placed on the frontwardly offset flank of a following tooth.

It is particularly advantageous when the width of the offset is at least equal to the thickness of a produced chip. this case, the V-shape is completely eliminated, and the chip has a flat shape which is particularly favorable for its release from the workpiece.

As a rule, the offset having the same width extends over the entire height of the tooth. However, the width of the offset can vary along the height of the chip. E.g., the width can diminish toward the free end of the tooth. Under certain circumstances, the offset can be formed only on a portion of the teeth, e.g., the radially outward quarter of the tooth height can be formed without an offset. The teeth flanks are so offset that they alternate along the circumferential plane from a row to a row and do not remove metal or remove a reduced amount of metal.

The thread milling cutter according to the present invention produces a complete profile of the thread undercut with each complete rotation of the cutter. With the thread milling cutter according tot he present invention, the advance feed is the same as when the thread is formed with a conventional thread milling cutter having smooth teeth, without offsets. The respective active shear force is decreased. The so-called cutting pressure is reduced. In the thread milling cutter according to the present invention, the teeth associated with a common circumferential plane, when viewed in the circumferential direction, alternate with respect to their tooth position and/or flank position.

According to the first embodiment of the present invention, in each of the rows, viewed in the axial direction, each tooth is spaced from a preceding tooth by a larger or smaller distance than form the following tooth, with larger and smaller distances alternating in each row. This thread milling cutter can be produced relatively simply because facing flanks of adjacent teeth are cut in the same way.

According to the second embodiment of the inventive thread milling cutter, all of the teeth in each row are spaced from each other by the same distance, with all of the teeth of one row being offset with respect to corresponding teeth of the adjacent row. With this embodiment, the teeth of each row are formed in the same way.

BRIEF DESCRIPTION OF THE DRAWINGS

The features and objects of the present invention will become more apparent, and the invention itself will be the best understood from the following detailed description for the preferred embodiments when read with reference to the accompanying drawings, wherein:

FIG. 1 shows a schematic side view of a thread milling cutter according to the present invention with positioned tooth flanks;

FIG. 2 shows schematically a developed view of rows of teeth of the thread milling cutter shown in FIG. 1;

FIG. 3 shows schematically a developed view of rows of teeth of another embodiment of a thread milling cutter according to the present invention with positioned tooth flanks;

FIG. 4 shows schematically a cross-sectional view of a row of teeth of the thread milling cutter shown in FIG. 3;

FIG. 5 shows schematically a cross-sectional view of a row of teeth of the thread milling cutter shown in FIG. 3, which is located adjacent to the row of teeth shown in FIG. 4; and FIG. 6 shows schematically a developed view of rows of teeth of yet another embodiment of a milling thread cutter with positioned tooth flanks.

DETAILED DESCRIPTION OF THE PREFERRED EMBODIMENTS

A thread milling cutter according to present invention, which is shown in FIGS. 1–5, has a shank 1 to be received in a chuck of a spindle of a machine-tool. A milling region 2 adjoins the front end of the shank 1. The milling region 2 is provided with locking grooves 3 and four rows 4, 14 of teeth 5 which are arranged one after another, with the teeth rows 4, 14 extending in the longitudinal direction of the locking grooves 3. The teeth 5 are separated by grooves 6 and form thread cutters 7, with each thread cutter 7 being limited by two flanks 8 and 9. The thread milling cutter according to the present invention is formed as a tap bohrer which has, at its front end, an end, piece 10 which is provided with axial and radial cutting edges 11. The thread milling cutter has an axis 12 which extends perpendicular to an imaginary circumferential plane 13. The teeth 5 of each two adjacent rows 4, 14 of teeth 5 differ in their position and/or shape.

In the embodiment of the thread milling cutter shown in FIGS. 1–2, the teeth 5 of the rows 4 and the rows 14, which are arranged about the axis 12 and alternate with each other, are substantially identical, with the teeth of each of the rows 4, 14 being spaced form each other by the same distance 15. However, the teeth 5 of the rows associated with the circumferential plane 13 are not symmetrically arranged with respect to the circumferential plane 13. Rather, flanks 8, 9, of the teeth 5 of both rows 4, 14 are displaced relative to each other in the axial direction so that of two adjacent, with respect to the circumferential plane 13, teeth 5 one tooth has a front offset 16 and the other tooth has a rear offset 17 defined by respective flanks 8, 9 of the two teeth.

In the embodiment of the thread milling cutter shown in FIGS. 3–5 the teeth 5 of each row 4, 14 are spaced from each other by alternating different distances 18, 19 in the axial direction. The distances 18, 19 are measured between outer ends of the teeth 5. The distances 18, 19 alternate from row 4 to a row 14 with respect to the circumferential plane 13. Thereby, here also, the front offset 16 and the rear offset 17 between flanks 8, 9 of respective teeth 5 can be observed. FIGS. 4–5 show that the flanks 8, 9 are inclined, with each teeth 5 forming, at its free end, a web 20 and with a groove 6 between adjacent teeth 5 forming a groove bottom 21. The grooves 6, which are defined by the larger distance 19 between the groove-limiting flanks of adjacent teeth 5, are deeper than those defined by a smaller distance 16. That is why the bottoms 21 of the deeper grooves 6 are arranged, deeper in the cutter core by an amount 22.

In the embodiments of FIGS. 1–5, the thread milling cutter has an even number of teeth rows. In the embodiment of FIG. 6, the thread milling utter has an odd number of teeth rows, namely, three rows 23. Generally, the thread milling cutter of FIG. 6 have the same construction as that of FIGS. 1–5, except as descried below. As in the embodiments of a milling cutter according to FIGS. 1–5, in the embodiment of FIG. 6, the milling cutter has a single locking groove 3 between two adjacent rows 23, and a groove 6 is provided between each two adjacent teeth 5. Each tooth 5 has opposite flanks 8, 9 and is associated with a respective circumferential plane 13. in each tooth row 23, the first tooth 5' forms a front offset 16, the adjacent second tooth 5" of the row forms a front offset 16 and a rear offset 17, and the adjacent third tooth 5'" of the row forms a rear offset 17. The sets of teeth 5', 5", 5'" follow each other in each row.

Further, the adjacent teeth rows 23 are offset relative to each other by one tooth so that the same teeth of all rows 23 are arranged on a common inclination line 24. E.g., the respective second teeth 5" of all rows 23, which define both the front offset 16 and the rear offset 17, are arranged on the inclination line 24. In each tooth, one flank forms a front offset 16 and the other flank forms a rear offset 17, with the front and rear offsets 16, 17 alternating with each other. Thus, in FIG. 6, the tooth 5" of the middle teeth row 23 defines, at one of its flanks, with respect to the associated tooth of the upper row 23, in the common circumferential plane, a front offset, and defines, at its another flank, with respect to the associated tooth of the lower row 23, in the common circumferential plane, a rear offset. Thus, on this tooth 5", front and rear offsets alternate.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A thread milling cutter, comprising a shank to be received in a spindle of a machine-tool which imparts to the thread milling cutter a rotational movement about a longitudinal axis of the cutter, a circular movement, and a feed movement; and a milling region adjoining the shank at a front end of the shank and including at least two rows of teeth and extending parallel to each other;

wherein the teeth of the at least two rows have same height, first flanks facing in a direction toward a free end of the milling region, and second flanks facing in a direction toward the shank;

wherein respective teeth of the at least two rows are located in respective imaginary circumferential planes extending perpendicular to the longitudinal axis of the thread milling cutter and parallel to each other, and wherein for each imaginary circumferential plane, viewed in a circumferential direction which is defined by a direction of the rotational movement of the thread milling cutter, the first flank of a respective tooth of one of the at least two rows is located, in an axial direction, in front of the first flank of a respective tooth of another of the at least two rows, defining, together with the first flank of the respective tooth of the another of the at least two rows, a front offset, and the second flank of the respective tooth of the another of the at least two rows is located, in the axial direction, behind the second flank of the respective tooth of the one of the at least two rows, defining, together with the second flank of the respective tooth of the one of the at least two rows, a rear offset, with front and rear offsets, which are formed by respective teeth of the at least two rows, alternating with each other.

2. A thread milling cutter as set forth in claim 1, wherein in each of the two rows, each tooth is spaced, in the axial direction, from a preceding tooth by one of a larger distance and a smaller distance than from a following tooth, with larger and smaller distances between the teeth alternating in each row.

3. A thread milling cutter as set forth in claim 1, wherein all of the teeth in each row are spaced from each other by a same distance, with all of the teeth of the one row being offset with respect to corresponding teeth of the another row.

4. A thread milling cutter as set forth in claim 1, wherein the cutter is designed for forming, during milling of a thread on a workpiece, chips having a predetermined thickness, and wherein the front offset has a width corresponding to the predetermined thickness of a to-be-formed chip.

* * * * *